Patented Oct. 8, 1940

2,217,466

UNITED STATES PATENT OFFICE 2,217,466

COMPOSITION OF MATTER FOR WATER TREATMENT

John R. Baylis, Chicago, Ill., assignor to City of Chicago, a municipal corporation No Drawing. Application September 17, 1937, Serial No. 164,372

9 Claims. (Cl. 210—23)

This invention relates to an improved process of water treatment involving the removal of substances by commonly known coagulants used in connection with a coagulation enhancing quantity of an agent including an alkali metal silicate.

Coagulation processes have been used extensively for many years in the treatment of water for purposes such as removal of colloidal and suspended particles which produce turbidity or color in water, and removal of bacteria or other objectionable substances. Compounds of aluminum and iron are used as the coagulants, these compounds reacting with alkaline compounds naturally present in or added to the water to produce an insoluble hydrous oxide or hydroxide of these metals which will form gelatinous masses of particles conducive to removal of suspended or colloidal substances from the water on settling.

A principal object of the present invention is the provision of an improved coagulation process in which the action of the coagulant is augmented by the use of coagulation enhancing quantities of an agent including an alkali metal silicate.

An additional object is to provide a coagulation process by which an appropriate water is treated in the presence of an alkaline material with a soluble aluminum or iron compound having the property of coagulating in the presence of the alkaline material and a separately added coagulation enhancing quantity of an alkali metal silicate, the alkali of which has been neutralized principally but not completely.

A further object is the provision of an improved coagulation process which is economical from the standpoints of materials employed and time required for the formation of a good floc and by which the size, strength and weight of flocculated particles are increased sufficiently to provide for more rapid settling, the production of clearer settled and filtered water, the lengthening of filter runs, the use of coarser filter mediums, and the production of good coagulation of water over a wider pH range than has been possible heretofore.

These and other objects will be observed upon consideration of the following description of a preferred embodiment of the invention.

Purification plants for public water supplies usually are composed of mixing and settling basins and filters. The purpose of the mixing basin is to mix the chemicals with the water, and then to continue gentle agitation of the water to form the small coagulated masses of particles into larger or denser masses of coagulated particles which will settle more rapidly than the smaller particles. Settling basins are used for removing much of the coagulated material from the water by sedimentation. The filters are for the purpose of removing the remainder of the coagulated material. Treatments which hasten the rate of coagulation naturally lessen the time needed for mixing, and treatments which hasten the rate of settling will lessen the time needed for sedimentation. Effective sedimentation is desirable in order to lessen the load on the filters used for removing residual suspended matter.

In addition to treatments involving clarification of water, coagulation is used somewhat extensively in connection with chemical treatment of sewage and in the softening of water. In these various applications of the coagulation process the effectiveness of the treatment and consequently its desirability depends upon such factors as the rapidity of the floc formation, the strength of the coagulated flocs, and their settling velocity.

The present invention includes the discovery that the coagulating characteristics of water-soluble compounds of iron and aluminum may be enhanced by the presence of a reaction product of an alkali metal silicate such as sodium silicate.

Sodium silicate, being an inexpensive material, is preferred as a source of the coagulation enhancing agent. While this material itself is of value in certain special instances it is rendered suitable by treatment with an acid or acid compound to the extent that most, but not all, of the alkali of the silicate is neutralized. This special form of the silicate is improved by allowing a short time for development or aging after addition of the acidic material and before use of the agent in the coagulation process.

The coagulation enhancing agent is of value in the treatment of waters containing a natural or added quantity of magnesium. While it is customary in softening processes to precipitate magnesium by means of an alkaline compound, such precipitation does not involve a satisfactory coagulation such as may be obtained by use of my partially neutralized silicate. The latter material will produce a precipitate at a lower pH value than ordinarily is required to bring down magnesium, thereby lessening the amount of alkali required, and this precipitate will coagulate the turbidity and other suspended materials in the water whereby they may be removed by sedimentation so completely that the use of a coagulant such as an iron or an aluminum compound may be in reduced quantities or even eliminated.

The commonly known coagulants with which the partially neutralized silicate is employed as a coagulation enhancing agent include the generally known iron and aluminum compounds such as ferrous sulfate, ferric sulfate, ferric chloride, chlorinated ferrous sulfate, sodium aluminate, aluminum sulfate, aluminum chloride, aluminum nitrate, and other soluble compounds of iron and aluminum. These materials and their coagulating characteristics are generally known in the industry.

Generally in the coagulating process the coagulant is employed in connection with a naturally present alkaline material or an added alkaline material such as calcium hydroxide, sodium hydroxide, or sodium carbonate, to form an insoluble compound with the iron or aluminum compound.

One method for forming the desired silicate is as follows:

A solution of a sodium silicate containing 25 to 30 per cent $SiO_2$ is diluated with water until the silicon dioxide content of the solution is of the order of 1 to 3 per cent. Sulfuric acid is then added to the solution until most of the sodium is converted to sodium sulfate, though the solution is left distinctly alkaline. When 42° Baumé sodium silicate containing 29 to 30 per cent silicon dioxide and 9 to 10 per cent sodium oxide is used, and the solution is diluted so that after treatment with the sulfuric acid the silicon dioxide content is 1.5 per cent of the solution, the remaining alkali concentration should require a certain amount of sulfuric acid to make it slightly acid to methyl orange. With the concentration of the solution stated, 10 cc. of the acid treated silicate solution should require the addition of about 10 to 14 cc. of N/50 sulfuric acid to make it slightly acid. The best quality of the silicate seems to be produced when about 12 cc. of N/50 sulfuric acid are required to make 10 cc. of the solution slightly acid to methyl orange. Some coagulating aid is given by a solution requiring 20 cc. of the N/50 acid to make it slightly acid, and some aid is given by a solution requiring only 5 cc. of the N/50 acid.

The limit of 10 cc. to 14 cc. of N/50 acid to make 10 cc. of the solution slightly acid to methyl orange includes the range in which the most suitable silicon compounds have been prepared with the particular grade of material and the particular concentration of silicate employed. The coagulation aid is not limited to this equilibrium of the solution for certain other grades of sodium silicate produce the desired form of silicate at different equilibrium. Also, variations in the concentration of the sodium silicate may require variations in the treatment. A principal reason for giving 10 cc. of N/50 acid for the lower limit is the quickness with which less alkaline solutions will form a jelly.

Other acids than sulfuric may be employed to advantage in the partial neutralization of the silicate, as may be acidic compounds. Carbon dioxide and hydrochloric acid may be used as described.

The advantages of the improved process may be illustrated by reference to the treatment of Lake Michigan water. Lake Michigan water was treated with 8 parts per million of aluminum sulfate, the water being stirred for about 30 minutes in a mixing basin and then passed through settling basins having about 3 hours settling time. The turbidity of the water entering the settling basin was 4.5 and the turbidity of the water leaving was 2.5. In a corresponding process Lake Michigan water was treated with approximately 2.5 parts per million of $SiO_2$ in the form of the silicate prepared in the manner specified herein, 8 parts per million of aluminum sulfate also being added as a coagulant. The turbidity of the water leaving the settling basin was only 0.1. In the first process the size of the largest coagulated particles in the first part of the settling basin was ⅛ to ¼ inch across. Where the prepared silicate was used the largest coagulated particles were ½ to ¾ inch across.

Further advantages in the use of the prepared silicate, together with the coagulant, are to be found in a reduction in the quantity of coagulants necessary. In clarifying a turbid river water it was necessary to employ 20 parts per million of aluminum sulfate. By employing the process of the present invention 2 parts of aluminum sulfate and 2 parts of $SiO_2$ in the form of the prepared silicate produced coagulation equal to that of the 20 parts per million of aluminum sulfate.

The use of 2 parts per million of $SiO_2$ in the form of the prepared silicate in connection with 10 parts per million of aluminum sulfate coagulant produced good coagulation of Lake Michigan water within 5 to 7 minutes stirring, whereas 20 to 30 minutes were required to produce equal coagulation when 10 parts per million of aluminum sulfate alone were used.

Coagulation processes often are used in connection with a softening operation by which the hardness-imparting constituents such as calcium and magnesium compounds are removed from the water. The softening operation by which the calcium and magnesium compounds are precipitated may lessen the hydrogen ion concentration of the water to such an extent that good coagulation is not obtained by the aluminum compounds. It is a characteristic of the present invention that the coagulation under such circumstances is improved by the use of the silicate as described. More particularly, the silicate coagulation enhancing agent has the property of producing coagulation with the aluminum and iron compounds over a wider variation of hydrogen ion concentration of the water than in the case of ordinary coagulation. Frequently it is not possible to obtain excellent coagulation of water with small amounts of aluminum sulfate or other coagulants when the hydrogen ion concentration of the water is between about 7.5 and 10.0 pH. My silicate coagulation enhancing agent aids the formation of a good coagulation within this range of hydrogen ion concentration. The presence of magnesium compounds in a water of this type is beneficial, although the invention obviously is not limited to water containing magnesium.

By the term "water" as used in the specification and in the appended claims, it is intended to include water intended for human consumption, industrial waters, domestic and industrial sewage waste waters and the like. It will be recognized that many changes may be made in the invention as described herein, and such changes are intended to be included in the appended claims.

I claim:

1. In a process of water purification, the step which comprises coagulating the impurities in the water by treatment with a combination of a soluble sulfate and a substantial quantity of an alkali metal silicate in minor proportion, the soluble sulfate being selected from a group consisting of iron and aluminum sulfates.

2. A process for the removal of suspended particles from water, which comprises adding to said water a coagulant from the group consisting of iron and aluminum coagulants and a sufficient quantity of a partially neutralized alkali metal silicate to augment the action of said coagulant.

3. A process as claimed in claim 2 in which said coagulant is selected from the group consisting of the inorganic salts of aluminum and iron.

4. Process as claimed in claim 2 in which said coagulant is selected from the group consisting of the chlorides and sulfates of aluminum and iron.

5. A process for the removal of suspended particles from water, which comprises adding to said water a coagulant from the group consisting of iron and aluminum coagulants and a sufficient quantity of a partially neutralized alkali metal silicate to augment the action of said coagulant in the presence of an alkaline material.

6. A process for the removal of suspended particles from water, which comprises adding to said water a coagulant from the group consisting of iron and aluminum coagulants and a sufficient quantity of an alkaline silicate prepared by treating an alkali metal silicate with an inorganic acid-reacting compound to the extent that the major portion but not all of the alkali in said silicate is neutralized to augment the action of said coagulant.

7. A process for the removal of suspended particles from water, which comprises adding to said water a coagulant from the group consisting of iron and aluminum coagulants and a sufficient quantity of a partially neutralized sodium silicate to augment the action of said coagulant.

8. A process for the removal of suspended particles from water, which comprises adding to said water a coagulant from the group consisting of iron and aluminum sulfates and a sufficient quantity of a partially neutralized sodium silicate to augment the action of said sulfate.

9. A process for the removal of suspended particles from water having a pH of 7.5 to 10, which comprises adding to said water a coagulant from the group consisting of iron and aluminum coagulants and a sufficient quantity of a partially neutralized alkali metal silicate to augment the action of said coagulant.

JOHN R. BAYLIS.